July 25, 1933.     N. WELKOVITZ ET AL     1,919,873
WIRE GLASS
Filed Dec. 4, 1929

Inventor
Ned Welkovitz
Alec S. Goldstein
By Stevens and Batchelor
Attorneys.

Patented July 25, 1933

1,919,873

UNITED STATES PATENT OFFICE

NED WELKOVITZ AND ALEC S. GOLDSTEIN, OF CHICAGO, ILLINOIS

WIRE GLASS

Application filed December 4, 1929. Serial No. 411,549.

Our invention relates to wire glass, and more particularly to the arrangement of the wire mesh therein, and our main object is to design the mesh with an arrangement which permits the matching of glass sections in both vertical and horizontal order.

A further object of the invention is to design the wire mesh with an arrangement which renders available for matching purposes pieces or remnants of glass otherwise considered as waste.

A still further object of the invention is to design a mesh arrangement which resists distorting influences.

Another object of the invention is to construct the novel mesh with frequent reinforcing elements, rendering the mesh firm and strong.

A final but nevertheless important object of the invention is to design the novel mesh on lines of simplicity and symmetry, whereby it will be inexpensive to produce and attractive in appearance.

With the above objects in view and any others that may suggest themselves from the specification and claims to follow, a better understanding of the invention may be had by reference to the accompanying drawing, in which—

Figure 1:
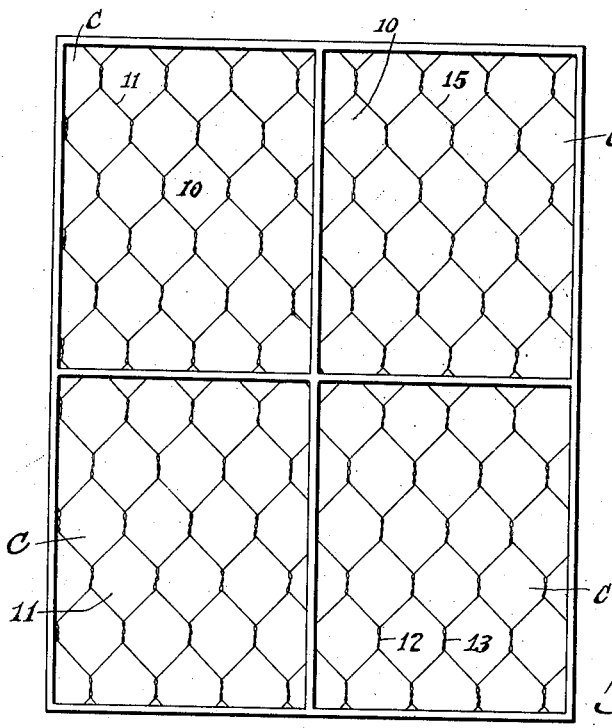
Figure 1 is an elevation of a typical wire glass installation in a frame.

In the manufacture of wire glass for fire-escape windows, partitions, casements and the like, two major points have been contended with. One of these is to use such care in laying the wire mesh as the glass is molded that the pattern may not become distorted; and the other is the matching of glass sections when addition or replacement is considered. The common form of wire glass mesh is generally hexagonal, as indicated by numeral 10 and the wire 11 being fairly thin it will be seen that a tendency arises when the mesh is handled in sheets to produce distortion over a portion or the entirety of the area, this being evidently due to the weakness of the mesh units. This weakness is due in part to the fact that the mesh units are only doubled at two points 12 and 13, by the twisting of the wire 11, and that the remaining unit wires 15 are even longer than the double portions 12 and 13 and will yield readily to distorting influences. The second difficulty lies in matching the hexagon design. Thus, ordinarily this design is viewed in vertically pointed order, as a diamond in cards, and as shown in Figure 1. Hence, in order to add more sections or to replace any, the available material must be of sufficient size to correspond with the sections already installed whereby to have the pattern continue in the same order. In case, however, sections are not readily found to match, pieces must be cut from stock to complete the job. In our novel embodiment the above difficulties have been overcome and a mesh arrangement produced which accomplishes the above outlined objects to their fullest extent.

Figure 2:
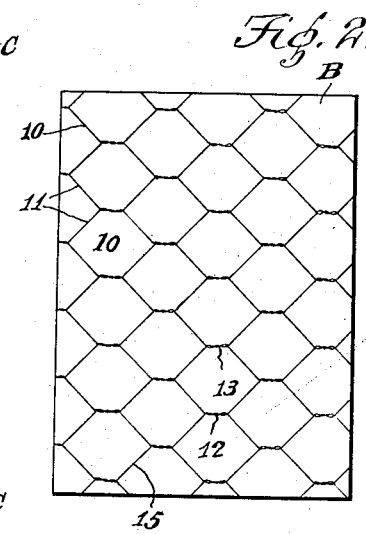
Fig. 2 is a view of a wire glass remnant of the same pattern as shown in Figure 1, but unsuitable for replacement in the installation thereof.

Referring in greater particular to the drawing, attention is directed to the odd or remnant wire glass section B shown in Figure 2. It will be seen that this section, though larger in area than any section C in the installation of Figure 1, cannot be replaced in the latter or added in case the frame is continued with more sections. The reason for this is that the odd section B is elongated transversely of the pointed design of the mesh, whereas the framed or regular sections C are elongated with the course of the mesh. The odd section will thus be too short to fit a frame unit when swung with the pattern to match the same. Ordinarily, an odd section or remnant of this kind must be discarded or stored until an order is received for an addition or replacement of a smaller dimension. Thus, a great deal of material goes into the discard or lies idle in wire glass shops, indicating waste and inefficiency.

Figure 3:
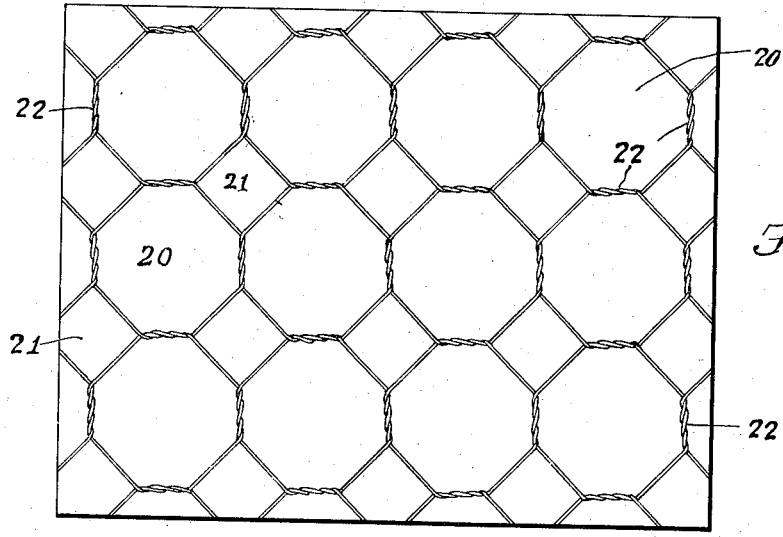
Fig. 3 is a view of a wire glass pane in which our novel mesh arrangement is contained.

By referring to Figure 3, it will be seen that we have created an arrangement of a regular octogonal mesh 20 alternated with a secondary diamond mesh 21. The octogonal mesh makes the same design 90° vertically and horizontally, these two directions being mainly affected in the matching of wire glass. It can therefore be conceived without further illustration that extra sections can be added or used for purposes of replacement without concern as to the direction of the design. Thus, no odd pieces considered as misfits can accumulate, as every extra piece can be used as long as it generally meets the dimensional requirements for one job or another. Further, it will be seen that each octagonal unit of the novel mesh is bounded by four doubled and twisted elements 22, which act as a reinforcement not only to preserve the form of the unit against distortional influences, but also to materially strengthen the unit and generally stiffen the entire sheet of the mesh. Thus, the sheet may be laid with less handling care than heretofore; and it may be guaranteed to make the glass resist fire and force to a much greater degree. By reference to Figure 3, it will be noted that the design of the mesh is such as to produce a plurality of series of regular polygons 20. Thus there are both horizontal and vertical series, which will be appreciated when it is realized that the polygons extend both upwardly and laterally in the plane of the paper. Further, it will be noted that the doubled common sides 22 are arranged in parallel straight lines both longitudinally and laterally, each side being spaced equidistantly from an adjacent side in the same plane. In other words, there are two sets of series of common sides, one set of a series parallel to another set of the same series and each of the series at right angles with respect to the other series. The novel mesh may be produced by machine methods, and in many instances the cost of the material may be lessened by the use of lighter wire, since the reinforcing factor compensates to make the mesh strong enough for average requirements. Obviously, wherever a lighter wire can be used, the factor of light obstruction in the glass by the wire is also materially lessened. In conclusion, it may be said that the novel mesh involves no radical departure from present methods and materials, and therefore occasions no hardship or added expense in the manufacture of the glass; also, the design of the mesh is symmetrical and attractive.

We claim:

1. A metallic core for wire glass, comprising a mesh, adjacent units of which are regular polygons, said polygons having doubled spaced common sides arranged in parallel lines both vertically and horizontally, said common sides spaced from each other.

2. A metallic core for wire glass, comprising a mesh, adjacent units of which are polygons, said polygons having doubled spaced common sides arranged in lines at right angles to each other, adjacent sides in the same line being spaced equally from each other.

3. A metallic core for wire glass, comprising a mesh, units of which are polygons, each polygon having two pairs of parallel spaced doubled sides at right angles to each other, adjacent doubled sides being spaced equidistantly from each other.

NED WELKOVITZ.
ALEC S. GOLDSTEIN.